Figure 10:
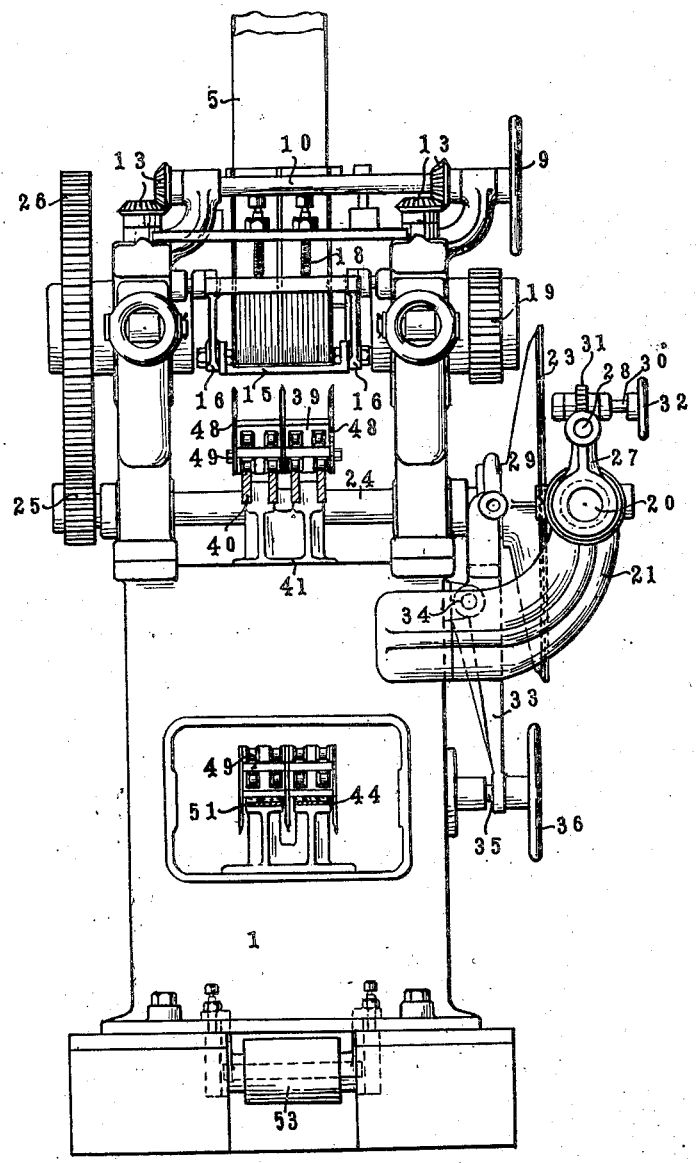

Dec. 2, 1930.  J. L. KELLOGG  1,783,434
COMBINATION TOASTING AND SHREDDING OVEN
Filed Nov. 9, 1922    10 Sheets-Sheet 1
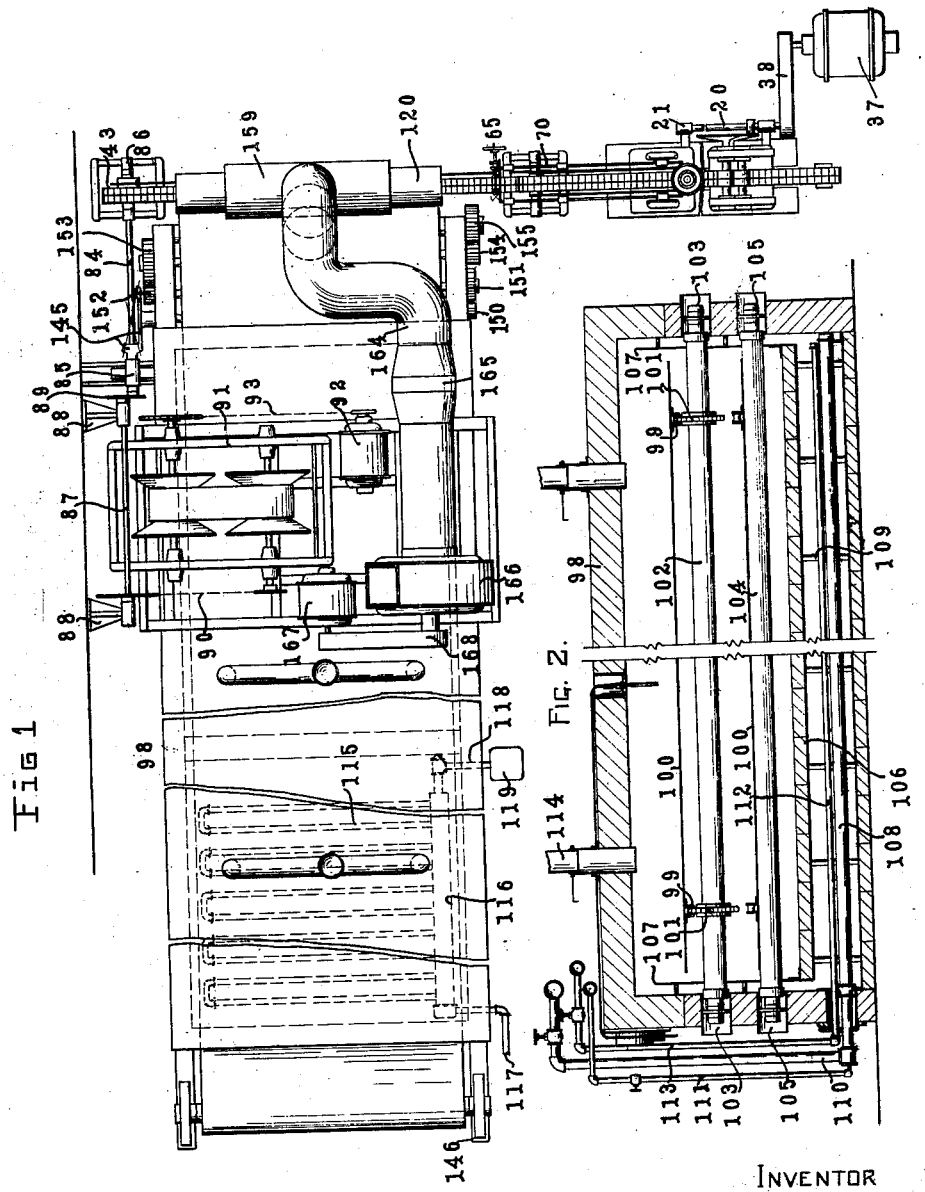
INVENTOR
John L. Kellogg
By Duell, Warfield & Duell
ATTORNEY

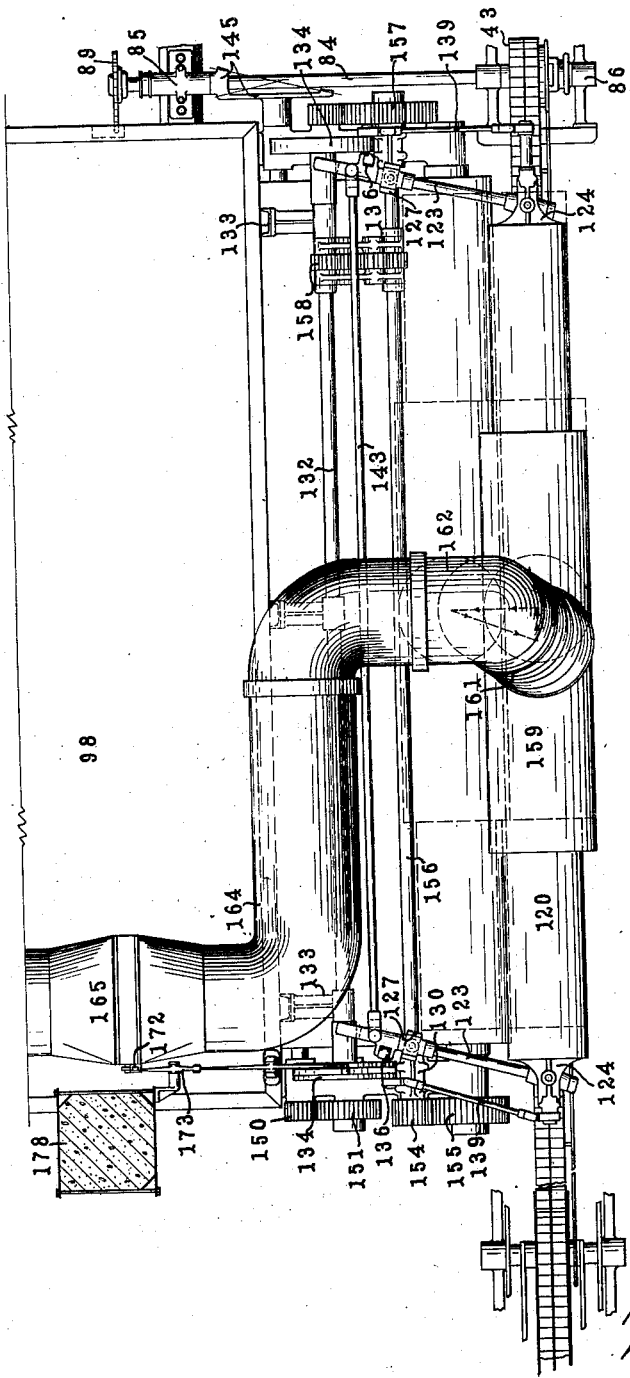

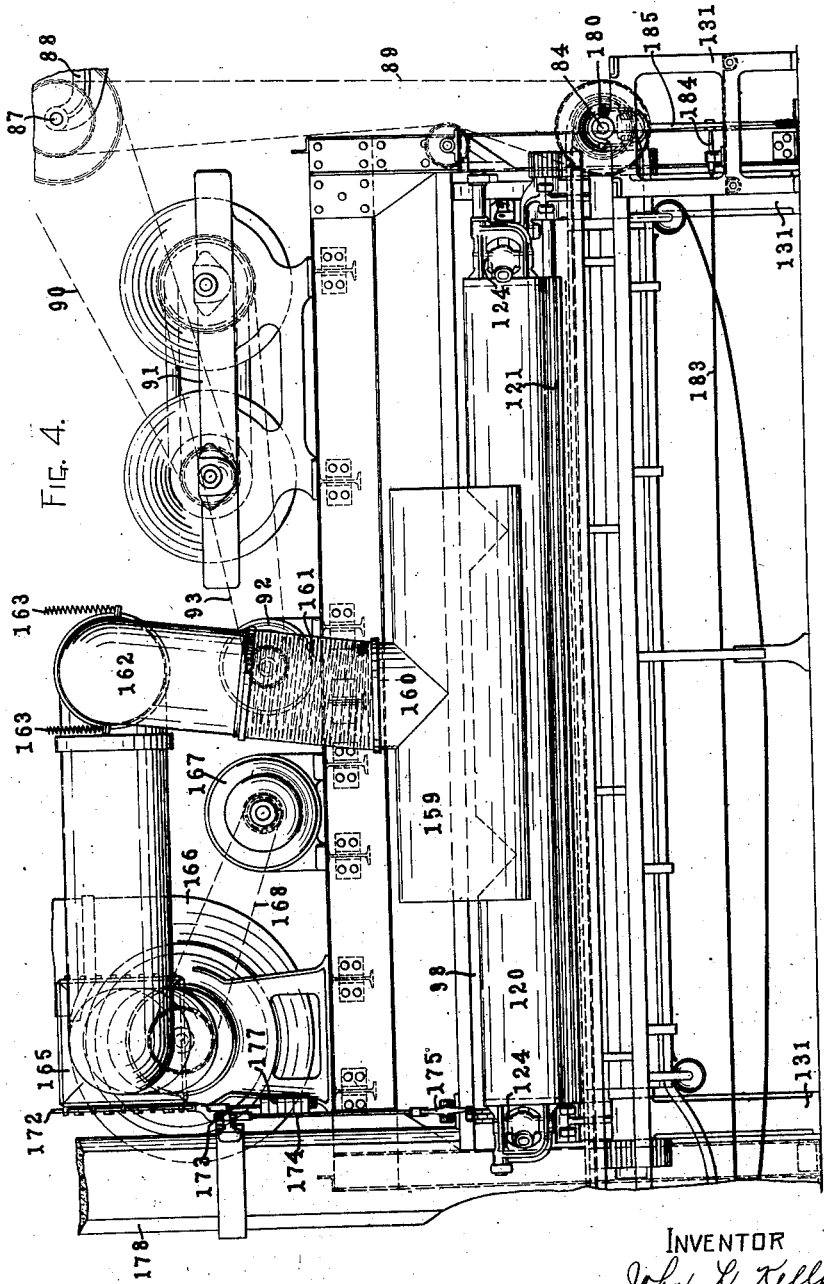

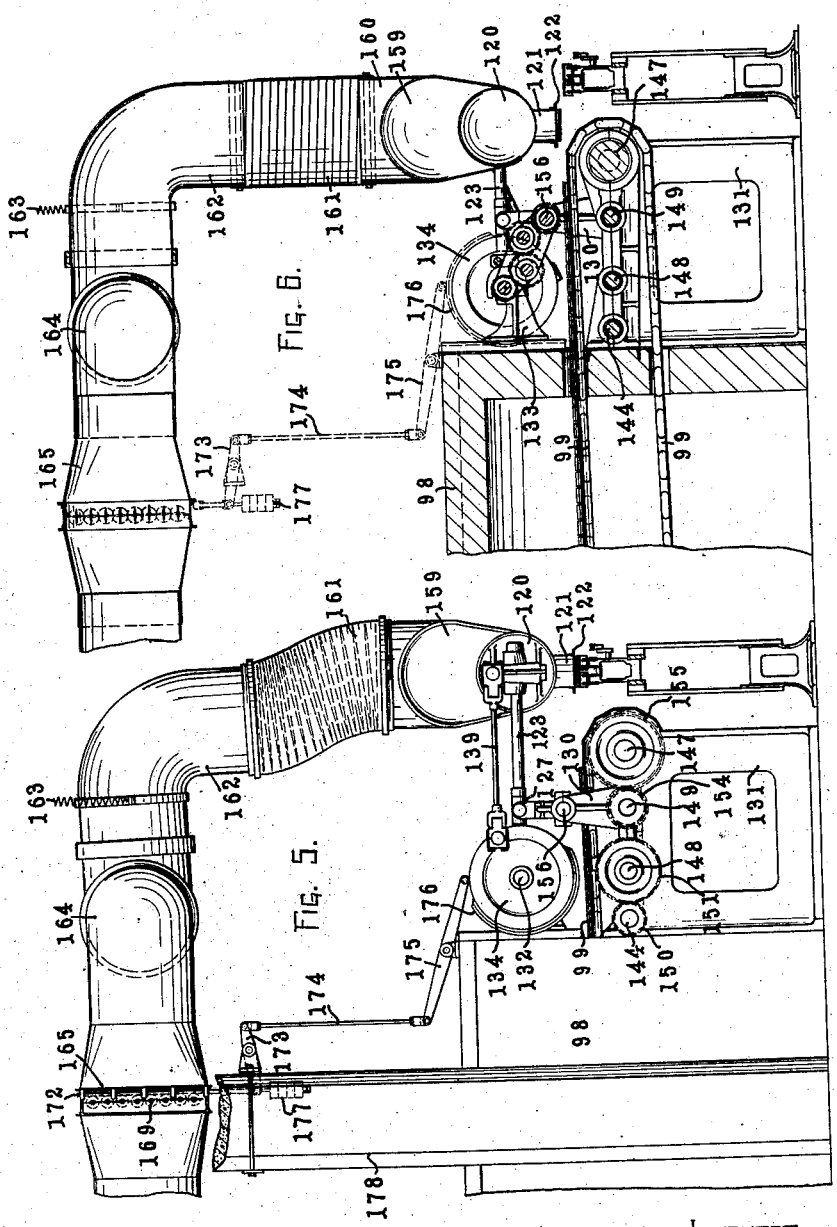

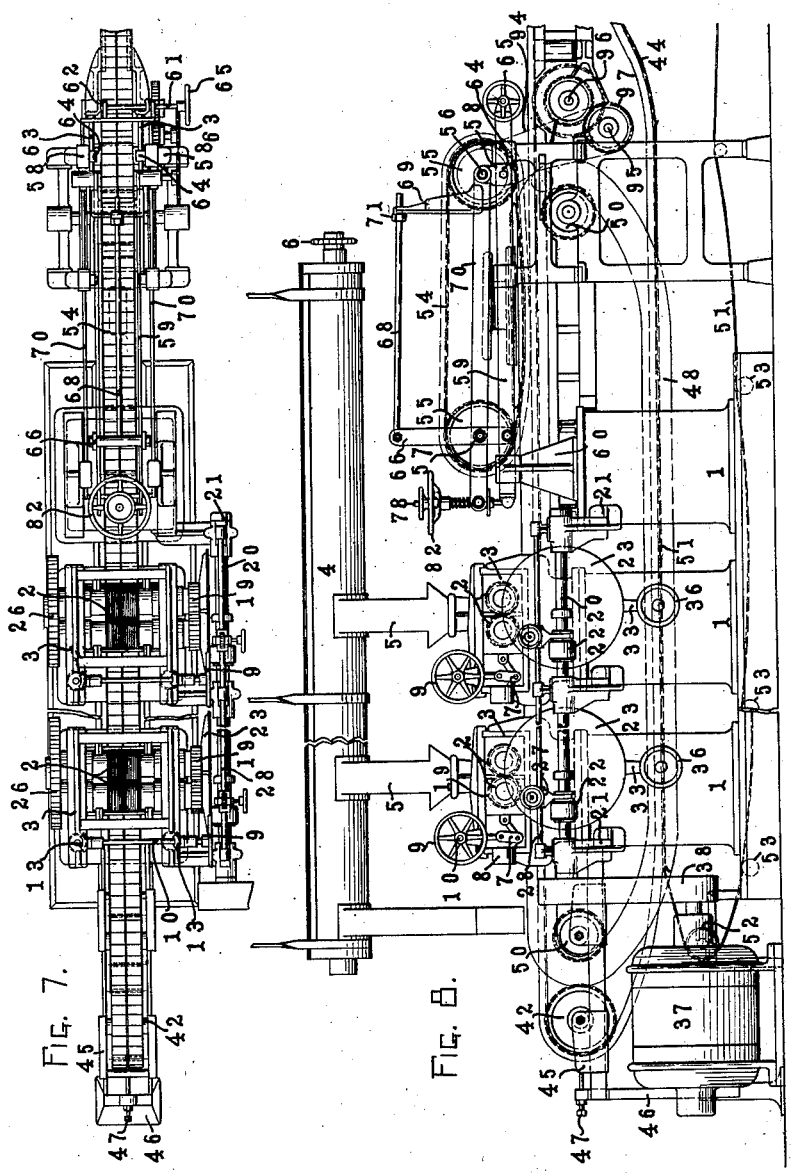

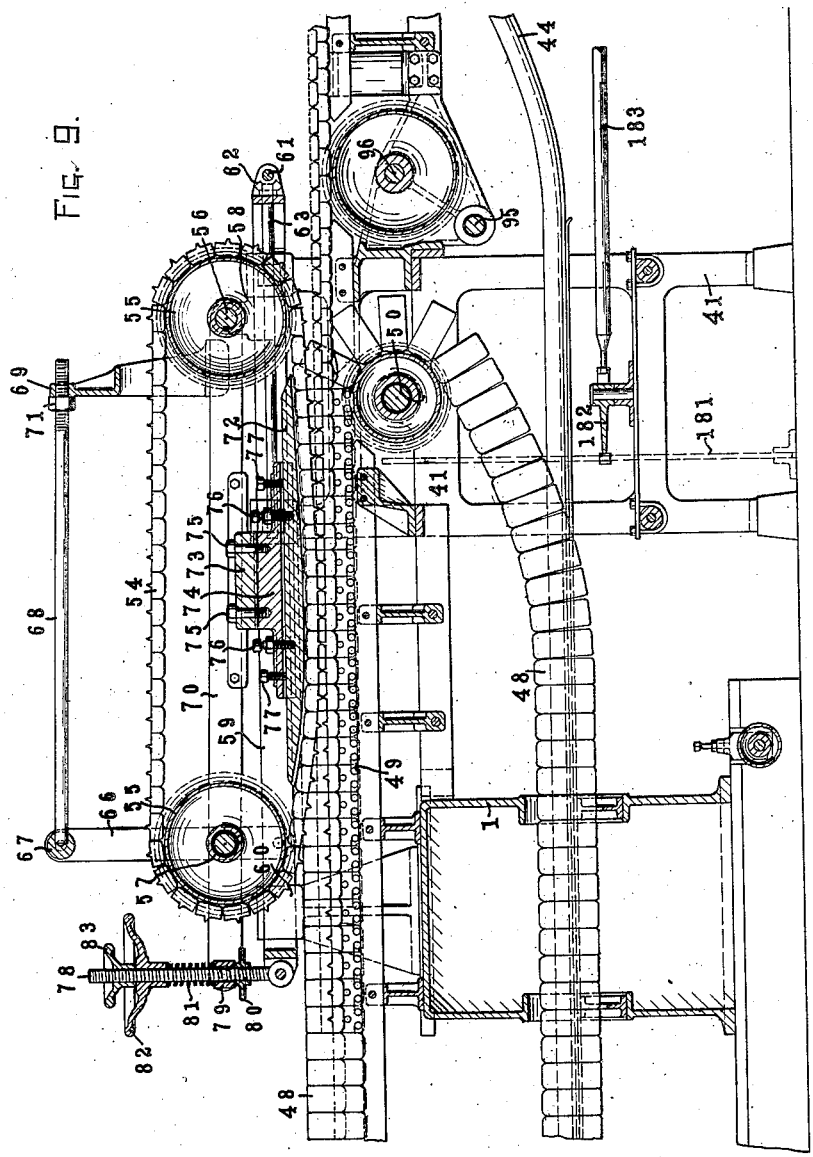

Dec. 2, 1930.   J. L. KELLOGG   1,783,434
COMBINATION TOASTING AND SHREDDING OVEN
Filed Nov. 9, 1922   10 Sheets-Sheet 7

INVENTOR
John L. Kellogg

ATTORNEY

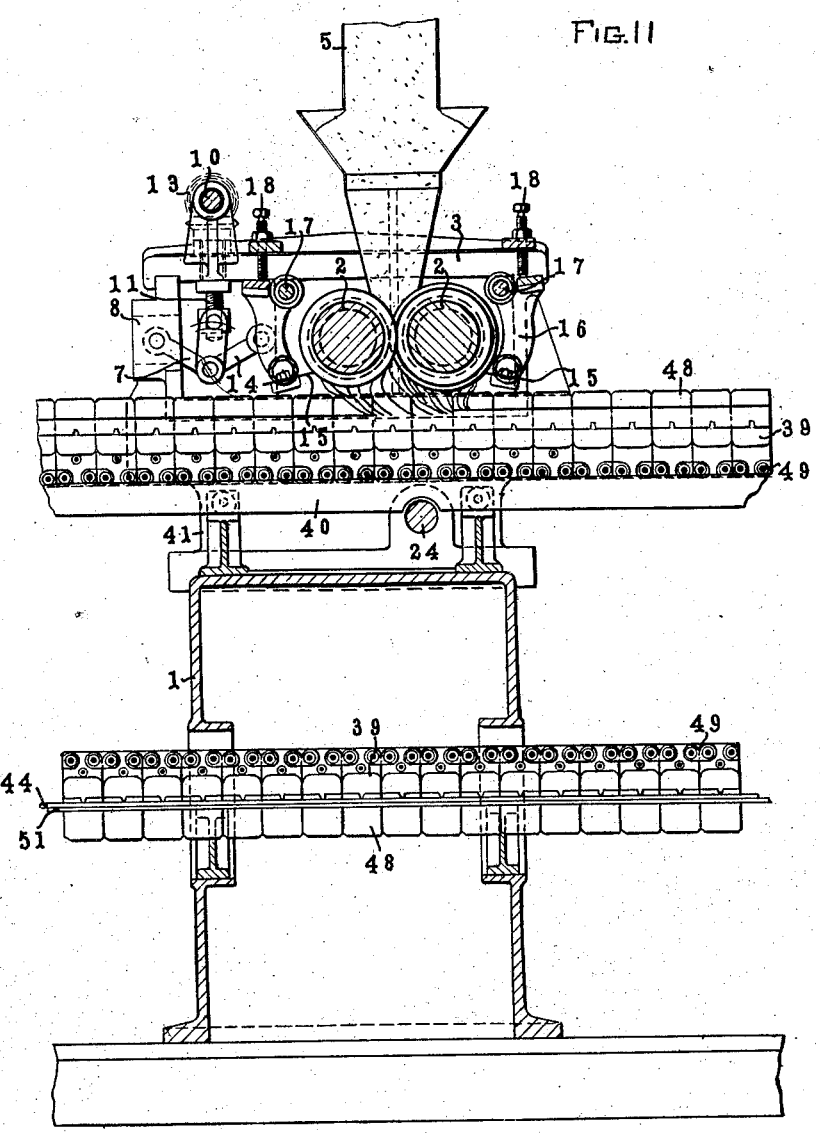

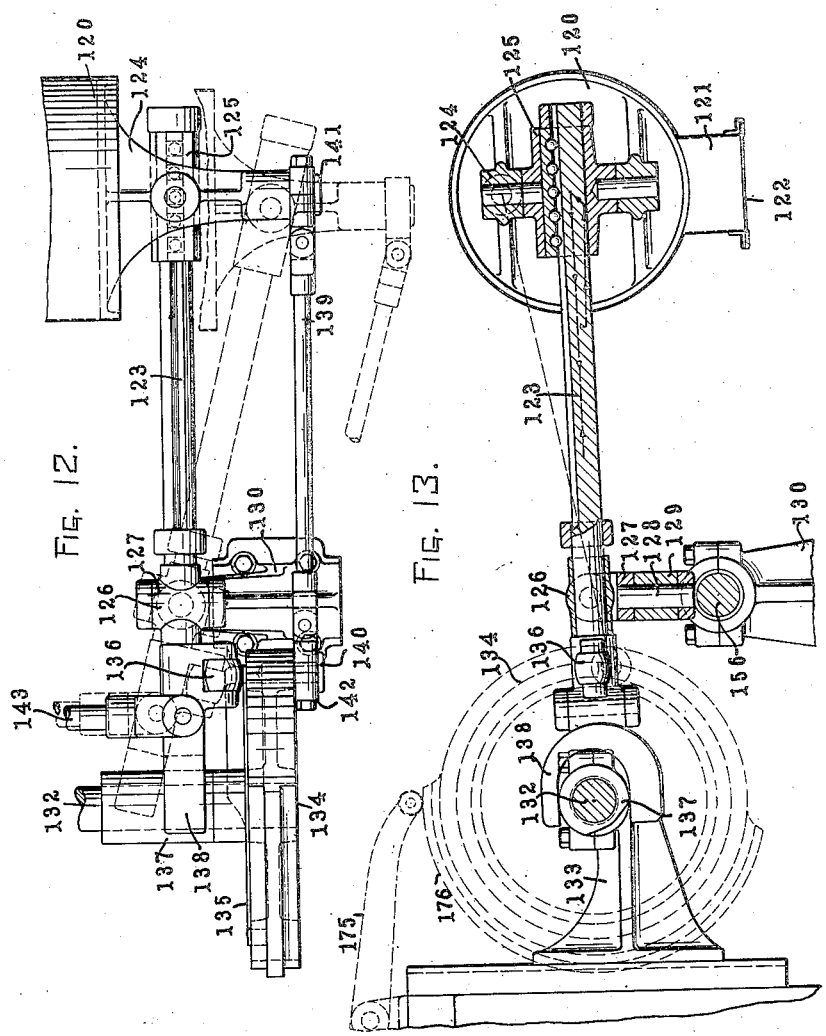

Dec. 2, 1930. J. L. KELLOGG 1,783,434
COMBINATION TOASTING AND SHREDDING OVEN
Filed Nov. 9, 1922 10 Sheets-Sheet 10

INVENTOR
John L. Kellogg
By
Duell, Warfield & Duell
ATTORNEY

Patented Dec. 2, 1930

1,783,434

UNITED STATES PATENT OFFICE

JOHN LEONARD KELLOGG, OF BATTLE CREEK, MICHIGAN, ASSIGNOR TO KELLOGG COMPANY, OF BATTLE CREEK, MICHIGAN, A CORPORATION OF DELAWARE

COMBINATION TOASTING AND SHREDDING OVEN

Application filed November 9, 1922. Serial No. 599,878.

This invention relates to an improvement in a combination shredding machine and toasting oven, and with respect to its more specific features to mechanism for forming the shredded material into biscuits and for transferring the biscuits to the oven.

An object of the present invention is to provide in a unitary structure, mechanisms for shredding cereals, for forming the shredded cereal into biscuits, and for puffing and drying the biscuits.

Another object is to provide mechanism in the form of cooperating upper and lower mold sections movable over endless paths arranged to superpose the upper sections on the lower sections during a portion of their travel.

Another object is to provide means to form limiting walls at the opposite sides of the lower mold sections during the feeding of the material and the forming of the same into biscuits.

Another object is to provide means for coordinating the movement of the upper and lower sections to cause them to register during the superposing of the sections.

Another object is to provide mechanism for bodily moving the sections of one series to correct inaccuracies of register and timing.

Another object is to provide means controlled by the moving of the sections, to press them together when they are superposed thereby to separate the shreds of the material between the biscuits.

Another object is to provide molding mechanism, in the form of a series of molds, movable in succession past the shredding mechanism, and controlled to open and closed position by the movement of the molds.

Another object is to provide an oven, having one end arranged to puff the biscuits and the other end arranged to dry the biscuits, and having in connection therewith a conveyor for moving the formed biscuits through the oven.

Another object is to provide mechanism for transferring the biscuits from the forming means to the conveyor without interfering with the continuous movement of either the forming means or the conveyor.

Another object is to provide in the transferring mechanism a pick-up head moving during portions of its travel adjacent to the forming means and to the conveyor, and at the same speed, to transfer the biscuits from the forming means to the conveyor, wherein the pick-up mechanism is controlled by the movement of the said means.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

Figure 14:
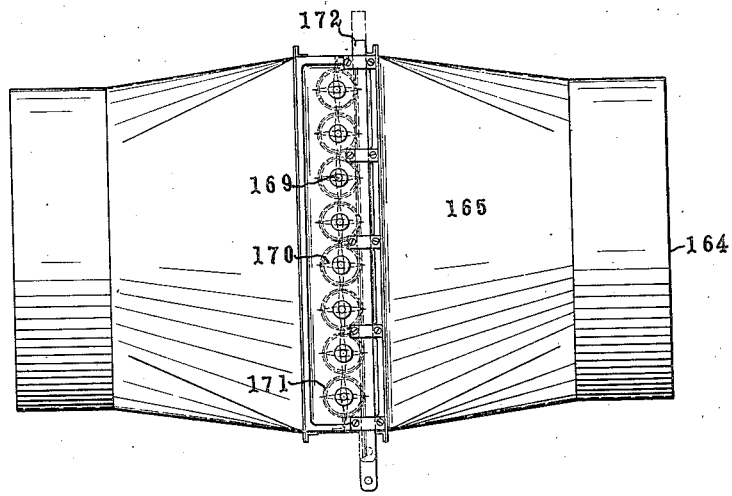
Figure 15:
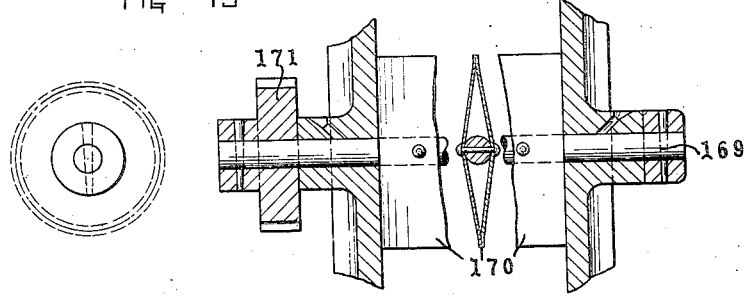

In the accompanying drawings forming a part of this specification wherein similar reference characters refer to similar parts throughout the several views, Figure 1 is a top plan view of the improved machine and oven, Fig. 2 is a transverse vertical section through the oven at the puffing chamber, Fig. 3 is a top plan view of the transferring mechanism, Fig. 4 is a front elevation, Fig. 5 is an end view with the parts in one position, Fig. 6 is a similar view with the parts in another position and with parts in section, Fig. 7 is a plan view of the shredding machine, Fig. 8 is a front elevation, Fig. 9 is a longitudinal vertical section through the biscuit forming mechanism, Fig. 10 is an end view of the shredding machine with parts in section, Fig. 11 is a longitudinal section through the shredding mechanism, Fig. 12 is a detail in plan of one of the supporting arms for the transferring mechanism, and its connections, Fig. 13 is a section on the line 13—13 of Fig. 12, Fig. 14 is an enlarged side view of the controlling valves for the suction head, and Fig. 15 is a detail sectional view of one of the valves.

In the present embodiment of the invention, a shredding mechanism is provided for shredding cereal, the said mechanism consisting of one or more shredding mills, which convert the material into shreds, and deliver the shreds to mechanism which forms them into biscuits. The mechanism for forming the shreds into biscuits is constituted by endless chains of upper and lower mold sections arranged to travel over endless paths and with the upper sections superposed on the lower sections during a part of their travel. The shredded material is fed into the lower sections, before the upper sections are superposed thereon, and mechanism is provided to form limiting walls at the opposite sides of the lower sections, during the filling thereof, and during the early part of their movement with the upper sections superposed. The oven, which is composed of two chambers, one of which is heated by gas, and is designed to puff the biscuits, the other being heated by steam, and designed to dry the biscuits, receives the formed biscuits, and bakes them. The biscuits are passed through the oven by a continuously moving conveyor, and transferring mechanism is provided for removing the biscuits from the forming mechanism and transferring them to the conveyor, arranged to travel between the forming mechanism and the conveyor, and to travel with said mechanism and conveyor when picking up the biscuits from the forming mechanism and depositing them on the conveyor.

Referring to Figures 1, 7, 8, 10 and 11, in which the shredding mechanism is more particularly shown, it will be noted that one or more shredding mills is provided, each of which is supported by a base 1, and each mill comprises a pair of annularly grooved rolls 2 journaled to rotate on parallel axes in a suitable casing 3, which is mounted on the base 1. The mills are arranged alongside each other, and they are supplied with a suitable cereal to be shredded, from a trough 4 which has discharge chutes 5 delivering to the respective mills, and the shredded material passes from between the rolls onto an endless chain of lower mold sections, to be presently described. The cereal is fed through the trough 4, by a screw conveyor, driven from a suitable source of power, by means of a sprocket wheel 6. The rolls 2 are adjustable toward and from each other, by means of toggle mechanism indicated at 7, arranged between the support of one roll and a fixed abutment 8 supported by the base 1. The toggle is operated by a hand wheel 9 on a shaft 10 journaled transversely of the casing 3, and connected to vertical screws 11 having threaded connection with the casing 3, by means of bevel gearing 13. The lower ends of the screws are connected to the toggles by links 14, and by moving the screws in the proper direction, the toggles may be bent or straightened, to move the adjacent roll 2 toward or from the other roll. The shredded material is removed from the grooves of the rolls by means of scraper plates 15 engaging the grooves, and supported by arms 16 pivoted at 17 to the casing 3. The scrapers are adjusted toward and from the rolls by means of set screws 18 threaded through the casing 3, and engaging the arms 16 to swing the lower ends of the arms toward and from the rolls, and each set screw has a lock nut for holding it in adjusted position. The rolls 2 have intermeshing gears 19, and they are driven from a drive shaft 20 journaled in brackets 21 on the base 1. The shaft has a friction roller 22, at each mill, which engages the face of a friction disc 23, secured to a shaft 24 journaled transversely of the casing 3, and has at the end remote from the friction disc a pinion 25 which meshes with a gear wheel 26 on the shaft of the adjacent roll 2. Each friction roller 22 is adjustable longitudinally of the shaft 20, to engage the adjacent disc 23 nearer to or farther from the center thereof, thereby to increase or diminish the speed of rotation of the rolls. The rollers are moved by means of forks 27 which engage annular grooves in the hubs of the rollers, and the forks are slidable on a rack shaft 28 supported above the shaft 20 in parallelism therewith. The bodies of the forks 27 have bearings 29 slidable on the rack shaft, and a shaft 30 is journaled in each bearing, transversely of the rack shaft. Each shaft 30 (see Fig. 10) has a pinion 31 meshing with the rack shaft, and a hand wheel 32 for rotating the shaft. By turning the wheel 32 in the proper direction, the fork may be slid longitudinally of the rack shaft, to move the roller 22 toward or from the center of the disc 23. The disc 23 may be moved away from the roller 22 to stop the operation of the adjacent mill, by means of a lever 33. Each of these levers is pivoted at 34 to the base 1 of the mill, and has a rotatable connection with the hub of the disc 23 at its upper end. The lower end has a bearing engaging a screw 35 extending outwardly from the base and having threaded thereon outside the bearing a handled screw 36. By turning the screw 36 in the proper direction, the disc may be moved out of contact with the friction roller, to stop the operation of the adjacent mill. The shaft 20 is driven by a suitable motor 37, in the present instance an electric motor, which is connected to the shaft by a belt 38.

The shredded material is fed to lower mold sections 39, which are linked together in an endless chain, the upper run of the chain being horizontal, and moving below the shredding mills. The upper run of the chain moves on guides 40 supported by the bases 1 and by a suitable framework 41 at the end remote from the shredding mills. At the ends of the machine, the chain passes over sprocket wheels 42 and 43, one of which, 43, is driven in a manner to be presently described, and the lower run moves on a suitable guide 44 supported by the bases 1 and the frame 41. The shaft of the wheels 42 is supported in a carriage 45, which is slidable in an extension frame 46 at the end adjacent to the shredding mills, and the carriage is moved by means of set screws 47, which have lock nuts in connection therewith for holding them in adjusted position. By moving the wheels 42, the tension of the chain may be adjusted.

While the shredded material is being deposited in the lower mold sections, means is provided to form a limiting wall at each side of the chain of molds, the wall moving with the molds. The wall in the present instance (see Fig. 11) is formed by side plates 48 which are connected in an endless chain by links 49. The chain carrying the side plates is mounted to move over an endless path, the upper run of which is below the upper run of the chain of lower mold sections. The arrangement is such that the chain 48—49 of side plates moves upon the guides 40, while the chain of mold sections moves on the chain 48—49, and the side plates are of sufficient length to extend well above the mold sections, as shown in Figures 9 and 11. The endless chain 48—49, is supported by rollers 50 journaled in the frames 41 and 46, and one of the rollers is driven in a manner to be presently described. The lower run of the chain 48—49 is supported by the guides 44 before mentioned, for supporting the lower run of the chain of mold sections. Referring to Figure 11, it will be seen that this guide extends through openings in the bases 1, and the upper run of an endless belt 51 of leather or the like moves upon the guide supporting the chains. The lower run of the chain of mold sections engages the leather belt, and the chain of side plates rests on the chain of mold sections. The belt 51 is supported at its ends by suitable rollers 52, and intermediate its ends on the lower run, by rollers 53. The belt 51 supports and moves with the mold sections, so that the said sections do not contact with the guides, but are supported in their movement thereover. The chain of side plates is shorter than the chain of mold sections, so that the side plates leave the mold sections after the compression of the material into biscuits. A series of upper mold sections 54 is linked together to form an endless chain, and this chain is supported by sprocket wheels 55, with its lower run adjacent to the upper run of the chain of lower sections. The respective wheels are secured on shafts 56 and 57, the shaft 56 being driven in a manner to be presently described, to drive the chain. The shaft 56 is journaled in bearings 58 supported on the side members of a frame 59, which is mounted to slide longitudinally of the chain of lower mold sections. The side members of the frame are slidable in bearing sleeves 60 supported by the frame 41 and the adjacent base 1. The frame is moved in the bearings by means of a shaft 61 journaled on the end of the frame remote from the shredding mills, and having bevel gear connections 62 with screw rods 63, which are threaded through nuts 64 on the inner faces of the bearings 58 adjacent to the shaft 61. The shaft 61 has a hand wheel 65, and by turning the wheel in the proper direction, the entire chain of upper mold sections may be adjusted longitudinally of the upper run of the chain of lower sections, to correct the setting of the chains should they get out of time or adjustment. The shaft 57 is journaled in arms 66 which are pivoted to the sides of the frame 59, and the upper ends of the arms are connected by a roller 67. A rod 68 engages this roller intermediate its ends, and the other end of the rod is threaded, and passes through a bearing in an arch 69 which connects a pair of links 70, whose ends, adjacent to the arch, are journaled on the shaft 56 before mentioned. A nut 71 is threaded onto the rod adjacent to the arch, and by turning the nut in the proper direction the shaft 57 may be moved toward or from the shaft 56, to tension the chain.

The links 70 before mentioned support a device for moving the lower run of the upper chain into close engagement with the upper run of the lower chain, thereby to mold the biscuits between the mold sections and the side plates, the side plates constituting the ends of the molds. The said device comprises a block 72 which is adjustably connected to a crossbar 73 supported by the links 70 before mentioned intermediate their ends. A hanger 74 is connected to the crossbar by screws 75, and the hanger is connected to the block by set screws 76 having lock nuts as shown. Other set screws 77 are threaded through the hanger into engagement with the block, and by means of the screws 76 and 77 the position of the block with respect to the hanger, may be varied. Means is also provided for adjusting the block with respect to the contacting runs of the chains, that is toward and from the guides 40. A threaded rod 78 is pivoted to the end member of the frame 59 adjacent to the shaft 57, and the rod passes through a bearing 79 connecting the forward ends of the links 70. A nut 80 is threaded onto the rod below the bearing, and a coil spring 81 encircles the rod above the bearing. The upper end of the spring is engaged by a hand wheel 82 threaded onto the rod, and a second wheel 83 is threaded onto the rod above the wheel 82. By means of the nut 80 the position of the adjacent end of the links, and the position of the presser block 72 with respect to the guides 40 may be varied. The spring 81 permits the presser block to yield upwardly in case a hard object should pass between the mold sections. The tension of the spring is adjusted by the hand wheels 82 and 83, the latter serving as a lock to lock the wheel 82 in adjusted position.

The operation of the above described mechanism is as follows—

The material shredded by the rolls 2 drops upon the lower mold sections, between the side plates, and as the mold sections travel, the side plates travel therewith, the sections eventually arriving at the position shown in Fig. 9. As the sections pass beneath the shaft 57, the upper mold sections begin to descend between the side plates, and the said sections are gradually moved toward the lower sections, until they engage therewith, beneath the lowest part of the presser block 72. The mold sections cooperate to cut the shreds connecting individual biscuits, the biscuits being formed between the upper and lower sections and the side plates. Referring to Fig. 9, it will be seen that four mold sections and two side plates cooperate for the forming of each biscuit. As the biscuits pass toward the shaft 56, the upper sections begin to lift away from the lower sections, and just before the biscuits pass beneath the shaft 56 the side plates begin to move around the wheels 50 and to move away from the mold sections. Beyond the shaft 56, the biscuits lie on the lower mold sections, in convenient position to be lifted therefrom and transferred to the oven.

The sprocket wheel 43 is mounted on a shaft 84 which is journaled in suitable bearings 85 and 86. A shaft 87 is journaled in bearings 88 at the end of the shaft 84 and in parallelism therewith, and the shafts 84 and 87 are connected by a chain and sprocket connection indicated at 89. The shaft 87 is connected by a sprocket connection indicated at 90 with a Reeves variable transmission indicated generally at 91, and driven by a motor 92, through a sprocket connection 93. The motor 92 drives the chain of lower mold sections through the variable transmission, and the chain of upper sections is driven by a sprocket connection 94 from a shaft 95 which is geared to a shaft 96 by gearing 97. The shaft 96 is journaled on the frame between the runs of the chain of lower mold sections, assists in supporting the upper run of the chain and is driven thereby.

The oven (see Figs. 1, 2, 4 and 6) consists of a casing 98 of suitable construction and material. An endless conveyor travels through the oven, whose long axis is at right angles to the direction of travel of the biscuit forming mechanism, constituted by the chains of upper and lower mold sections. The conveyor consists of chains 99 connected by transversely extending flights 100, of perforate material, and the chains are supported on the upper run of the conveyor intermediate the ends of the run by sprocket wheels 101, secured on pipe shafts 102 journaled in bearings 103 in the oven walls. At its ends the conveyor extends beyond the oven, and it is supported in a manner to be presently described. The lower run of the conveyor is supported by rollers 104 journaled in bearings 105 in the oven wall, and the body of the oven is separated from the combustion chamber by a housing 106, which is arranged below the rollers 104, and below the lower run of the conveyor, and which extends upwardly at each side wall in spaced relation, to near the top of the oven, as indicated at 107. The spaces between the extension 107 and the oven walls provide passages for distributing the heat from the combustion chamber into the top of the baking chamber, thus to bake the biscuits from the top down, utilizing the moving heated air, instead of radiant heat.

The combustion chamber is heated in that portion of the oven which is adjacent to the biscuit forming mechanism by a burner 108 of suitable construction, in the present instance a gas burner, the pipes of the burner being arranged beneath the housing 106, which is supported from the bottom of the oven by means of struts 109, the pipes of the burner being arranged between the struts. Gas is supplied to the burner by a supply pipe 110, and an air pipe 111 is provided for supplying the burner with air, the pipes 110 and 111 being valve controlled as shown. A lighter 112 extends the full width of the oven for lighting the burner 108, and the lighter is supplied with gas by a pipe 113, which is also valve controlled. The oven has suitable damper controlled vent flues 114 for removing the vapor and gases. The drying chamber of the oven, which is that portion remote from the biscuit forming mechanism, is heated by steamcoils 115, supplied from a header 116 which is connected with the coils and with a steam line 117. The header also has a drain pipe 118 leading to a steam trap 119. The drying chamber of the oven differs from the puffing chamber in its heating mechanism and in the ommission of the brick enclosing walls and the sheet metal extensions 107. The conveyor 99—100 moves continuously through the oven, delivering the completed biscuits at the end remote from the forming mechanism. The oven conveyor moves at right angles to the biscuit forming mechanism, which is also a conveyor, and transferring mechanism is provided for transferring the biscuits from the forming mechanism to the oven conveyor.

The said mechanism (see Figs. 3, 4, 5 and 6) includes a distributing pipe or chamber 120 having a pick-up nozzle or suction head 121 of rectangular outline, and covered on its open or bottom side by a screen 122 of fine mesh. The area of the open side of the nozzle depends upon the number of biscuits which it is desired to transfer at one time, usually a gross being simultaneously picked up and moved to the flights of the oven conveyor. The head is supported by arms 123 at its ends, the arms being slidably and swingably connected with bracket arms 124 secured to the ends of the chamber 120, a pair of vertically spaced bracket arms being provided at each end of the chamber. Referring to Figs. 12 and 13, it will be noticed that the arm 123 slides through a sleeve 125, which is pivoted between the bracket arms 124 to swing on a vertical axis, and the arm is keyed to the sleeve to permit the sleeve to slide longitudinally thereof, but to prevent relative angular movement of sleeve and arm. Each arm 123 has a transverse bearing 126 intermediate its ends, which is received between arms of a yoke 127, and is pivotally connected thereto as shown. Each yoke has a depending pin 128, which is journaled in a bearing 129 supported by a bracket 130 upstanding from a frame 131 at the front of the oven casing. The arms 123 are thus mounted to swing in a horizontal plane, and in a vertical plane, and the swinging in both directions as well as the movement of the suction head on the arms, is controlled by cams on a shaft 132 journaled transversely on the front of the oven in brackets 133, and driven in a manner to be presently described. Cams 134 are secured to the shaft near its ends, each cam having a cam surface 135 on its inner face with which cooperates a roller 136 journaled on the adjacent end of the arm 123. When the roller engages the elevated surface of the cam, the arms are swung into the dotted line position of Fig. 12, carrying with them the suction head. In picking up biscuits from the forming means, the swinging movement of the arms above mentioned enables the suction head to travel with the forming mechanism during the picking up of the biscuits, and the arms are then swung in a vertical plane to slightly elevate the suction head, so that it will not interfere with the lines of oncoming biscuits. The vertical swinging is brought about by barrel cams 137 on the shaft 132, a cam 137 being arranged adjacent to each cam 134. The adjacent end of each arm 123 has a fork 138 at the cam 137, and the arms of the fork engage above and below the cam. The barrel cam has a depressed portion as shown in Fig. 13 which when the suction head is in position to pick up biscuits from the forming mechanism will register with the lower fork arm, and the suction head will be permitted to drop slightly to engage the biscuits, and will be immediately raised, to move the picked up biscuits far enough above the forming mechanism to prevent interference with the oncoming biscuits. The suction head is moved toward and from the oven, to deposit the picked up biscuits on the flights of the oven conveyor, by means of the cams 134. A crank arm 139 is arranged at each end of the suction head, each arm being pivoted at one end to the brackets 124, and at the other to a wrist pin 140 on the cam. The crank arms have bearings 141 and 142 which engage the bracket and wrist pin respectively, and the body of the crank arm is hinged to the bearings as shown in Fig. 12, to swing on vertical axes, so that there is no interference with the swinging movement of the suction head. The arms 123 are connected in rear of the brackets 130 and are constrained to swing together by a cross-rod 143, which is pivoted at its ends to the arms, adjacent to the forks 138. The shaft 132 is driven from the shaft 84 before mentioned. A shaft 144 is journaled in the framework 131 adjacent to the furnace wall, and the shaft is connected to the shaft 84 by bevel gearing 145. The ends of the oven conveyor which extend beyond the ends of the oven casing, are supported by sprocket wheels on shafts 146 and 147 respectively, the former being at the rear of the furnace, while the latter is at the front, being supported by the frame 131. Other shafts 148 and 149 are journaled in the frame between the shafts 144 and 147, the four shafts 144, 147, 148 and 149 being in the same horizontal plane. The shafts 144 and 148 are connected by gears 150 and 151, the former being on the shaft 144, while the latter is on the shaft 148. The shafts 148 and 149 are connected by gears 152 and 153, the former being on the shaft 148, while the latter is on the shaft 149. The shafts 149 and 147 are connected by gears 154 and 155, the former being on the shaft 149, while the latter is on the shaft 147. The shaft 156 is journaled in the brackets 130 before mentioned, directly above the shaft 149, and it carries a gear 157 meshing with the gear 155 on the shaft 147. A train of gears 158 connects the shaft 156 with the shaft 132. Thus both conveyors, the forming mechanism being in effect a conveyor, and the cam shaft for controlling the suction head, which is a transferring mechanism, are driven by the same motor 92.

The distribution chamber 120 has connected therewith a plenum chamber 159 having an inlet 160 which is connected by a flexible connection 161 with an elbow 162. The elbow which is supported by springs 163 communicates by means of a second elbow 164 with a valve casing 165, which in turn is connected with the inlet of a suction fan 166 supported on the furnace casing, and driven by a motor 167 through a belt connection 168. Within the valve casing (Figs. 5, 14 and 15) is arranged a series of valves, in the form of shutters arranged to overlap, to close communication through the chamber, or to be moved into parallelism, to open the chamber.

Each valve comprises a shaft 169 journaled in opposite walls of the casing, and having secured thereto within the casing a shutter leaf 170. In the present instance the shutter leaves are hollow bodies, diamond shaped in cross-section, the shaft extending through the body at the center thereof and being secured thereto. Each shaft is provided with a pinion 171 outside the casing, and all of the pinions are engaged by a rack bar 172 having guided movement on the side wall of the casing, as shown in Fig. 14. The lower end of the rack bar is linked to one end of a lever 173 pivoted intermediate its ends, and connected at its opposite end by a link 174 with one end of a cam lever 175 pivoted on the oven casing, and having at the opposite end from the link a friction roller engaging the periphery of the cam 134. This cam has on its periphery a cam surface or elevated portion 176, which when the suction head is above the forming mechanism will operate the lever 175 to open the valves in the valve casing, to connect the suction head with the exhausting mechanism. The valves will be held open by the cam, until the suction head is above the oven conveyor, when the roller passes off the elevated portion of the cam, and a counter-weight 177 returns the valves to closed position. The lever 173 is supported by a pillar 178 or other suitable support. The upper run of the chain or lower mold sections, which is of considerable length, is supported intermediate its ends by sprocket wheels 179 on the shaft 96 before mentioned, and in order to prevent disengagement of the chain from the sprocket wheels at this point, an electromagnet 18 is arranged below the chain, the pole of the magnet being directly beneath the chain.

The operation of the improved machine is as follows:—

A suitable cereal is fed to the shredding machine, and formed into shreds by the shredding rolls 2. The shreds are scraped from the rolls by the scrapers 15, and deposited on the upper run of the chain of lower mold sections 39, the side plates 48 at this time being in place at opposite sides of the chain, to hold the material from overflowing. As the mold sections move away from the shredding mills, they come beneath the upper mold sections 54, which are gradually superposed thereon, forming the shreds into biscuits with the co-operation of the side plates, and separating the adjacent biscuits from each other. When the upper mold sections lift from contact with the lower sections, the biscuits lying on the lower sections are moved along to the transferring mechanism 120. At regular intervals, the suction head 121 is moved above the chain of lower mold sections 39, and a plurality of biscuits is lifted from the chain. The suction head swings with the chain of mold sections during a portion of its travel, so that there is no interference with the oncoming biscuits, and as the biscuits held by the suction head are lifted above the level of the biscuits on the forming chain, the head is moved toward the oven conveyor, and the biscuits are dropped thereon. The air valves 170 are opened when the suction head engages the biscuits on the forming chain, to connect the head with the source of fluid pressure, and the valves are closed when the suction head is above the flights of the oven conveyor, so that the biscuits are dropped thereon. At the proper speed, the biscuits are moved through the puffing and drying ovens, and emerge from the end of the oven remote from the forming chain in finished condition. The movement of all of the parts is coordinated, so that they operate in the proper relation with respect to each other to continuously produce finished biscuits when in operation.

The shaft 87 may be connected to the shaft 84, or disconnected therefrom, by means of a clutch indicated at 180. The clutch is operated from the shredding mill end of the machine, by means of a handle 181 pivoted at its lower end to a fixed support, and connected intermediate its ends to one end of a lever 182, pivoted on the frame 41. The other end of the lever 182 is connected by a link 183, with one end of a lever 184 pivoted on the frame 131. The other end of the lever 184 is pivoted to the body of a fork 185, whose arms engage the clutch and the body of the fork is pivoted to a fixed support. By means of the handle 181, the clutch may be operated to connect or disconnect the shafts 84 and 87.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention, which, as a matter of language, might be said to fall therebetween.

Having described my invention, what I claim as new and desire to secure by Letters Patent is:—

1. In a machine of the class described, in combination, shredding mechanism, moving means to receive the shredded material and mold it into biscuits comprising upper and lower mold sections cooperating with each other to mold said material by pressure, the pressure being applied solely by said sections, an oven, a conveyor for transporting the biscuits through the oven, and means for transferring the biscuits from the molding means intermediate the ends of the range of travel of said moving means to the conveyor.

2. In a machine of the class described, in combination, shredding mechanism, means for removing shredded material from said mechanism, means for forming biscuits from said material, comprising endless chains of upper and lower mold sections having runs thereof adjacent to which said material is delivered, means for supporting and moving each chain, adjustable means for coordinating the movement of the chains to cause the sections of one chain to register with those of the other on the adjacent runs, means for imparting relative movement toward and from each other to the adjacent runs, and means for bodily moving one chain at will to correct the adjustment of the chains.

3. In a machine of the class described, in combination, mechanism for forming biscuits including an endless chain of bottom mold sections, and a second endless chain of substantially flat plates forming walls at opposite sides only of the mold sections during the filling thereof.

4. In a machine of the class described, in combination, mechanism for forming biscuits, including an endless chain of bottom mold sections, shredding mechanism delivering to the sections, and means comprising an endless chain of substantially flat plates cooperating with said sections to form walls solely at the sides of the chain to prevent overflow of the shredded material, and to assist in molding the material during travel of the sections.

5. In a machine of the class described, in combination, mechanism for forming biscuits, including an endless chain of mold sections, a second chain composed of flat side plates, and means for moving the chains to cause the first chain to ride upon the second chain between the plates during a portion of the travel of the sections.

6. In a machine of the class described, in combination, mechanism for forming biscuits, including lower mold sections, and upper mold sections, each section being formed of a plurality of parts, means for moving the upper and lower sections over endless paths with the upper sections above the lower sections during a portion of their travel, means comprising flat plates movable in endless paths, to form mold completing walls at opposite sides of the lower sections during the early portion of their travel adjacent to the upper sections, means to retain said walls in position until the biscuit is formed and means controlled by the movement of the upper sections for pressing them toward the lower sections.

7. In a machine of the class described, in combination, upper and lower mold sections, means for moving the sections over endless paths with the upper sections above the lower sections during a portion of their travel, means for feeding material to the lower sections prior to their arrival below the upper sections, mold completing side walls for said mold sections movable independently of said mold sections, and means to position said walls at opposite sides of the lower sections while they are being filled and during the early portion of their travel beneath the upper sections.

8. In a machine of the class described, in combination, cooperating top, bottom and side mold sections for forming biscuits, means for moving the sections over endless paths with the sections adjacent during a portion of their travel, means controlled by the movement of the sections for gradually moving them together during the said portion of their travel, and adjustable means for coordinating the movement of the top and bottom sections to cause them to register when they are moved together, and means to vary the tension on said top mold sections.

9. In a machine of the class described, in combination, upper and lower mold sections, means for moving the sections over endless paths with the upper sections above the lower sections during a portion of their travel, and manually adjustable means controlled by the movement of the sections for gradually moving the sections into contact during the said portion of their travel, and a frame in which said upper mold sections are mounted, and means to vary the position of said frame thereby to vary the position of said upper sections relative to said lower sections.

10. In a machine of the class described, in combination, molds for forming the biscuits including upper and lower sections concave from side to side and adapted to contact at their opposite sides, and side plates engaging the ends only of the sections to close and complete the molds.

11. In a machine of the class described, in combination, molds for forming biscuits composed of upper and lower sections mounted to move over endless paths with the upper sections above the lower sections during a portion of their travel, said sections being concave from front to rear, and means moving with the sections when they are superposed and engaging the opposite sides only thereof to close and complete the molds.

12. In a machine of the class described, in combination, molds for forming biscuits composed of upper and lower sections mounted to move over endless paths with the upper sections above the lower sections during a portion of their travel, said sections being concave from front to rear, means controlled by the movement of the sections for moving them into contact while the upper sections are above the lower sections, and means moving with the sections during the said portion of their travel and engaging opposite sides only of the sections to close and complete the ends of the molds.

13. In a machine of the class described, in combination, shredding mechanism, a series of molds formed of sections, said molds being divided intermediate their ends, means for moving the molds past the shredding mechanism in succession, and means controlled by the movement of the molds for successively assembling the sections to form open containers for receiving material and to afterwards close the molds to mold the material into biscuits.

14. In a machine of the class described, in combination, shredding mechanism, a series of molds formed of sections, said molds being divided intermediate their ends, means for moving the molds past the shredding mechanism in succession, and means controlled by the movement of the sections for successively assembling the sections to form open containers and closed molds, and for afterwards disassembling the sections to expose the molded biscuits.

15. In a machine of the class described, in combination, shredding mechanism, a series of molds formed of sections, said molds being divided intermediate their ends, means for moving the molds past the shredding mechanism in succession, means controlled by the movement of the sections for successively assembling the sections to form open containers and closed molds, and for afterwards disassembling the sections to expose the molded biscuits, and means for removing the biscuits.

16. In a machine of the class described, in combination, shredding mechanism, a series of molds formed of sections, said molds being divided intermediate their ends, means for moving the molds past the shredding mechanism in succession, means controlled by the movement of the sections for successively assembling the sections to form open containers and closed molds and for afterwards disassembling the sections to expose the molded biscuits, an oven, and means for removing the biscuits and transporting them through the oven.

17. In a machine of the class described, in combination, shredding mechanism, molding mechanism and an oven, a conveyor for said molding mechanism, and a conveyor for said oven, said conveyors, movable continuously in directions at substantially right angles to each other, and means movable with each conveyor over a portion of its travel and at substantially the same speed for transferring the articles from the mold conveyor to the oven conveyor.

18. In a machine of the class described, in combination, shredding mechanism, molding mechanism, and an oven, a conveyor for said molding mechanism and a conveyor for said oven, said conveyors movable continuously in directions transverse to each other, means movable along the line of travel of the mold conveyor during a portion of its movement and along the line of travel of the oven conveyor during a subsequent portion of its movement, for picking up articles from the mold conveyor and transferring the articles to the oven conveyor.

19. In a machine of the class described, in combination, shredding mechanism, molding mechanism, and an oven, a conveyor for said molding mechanism and a conveyor for said oven, said conveyors movable continuously in directions transverse to each other, and means independent of said conveyors for picking up articles from the mold conveyor and transferring the articles to the oven conveyor, said means movable with the first conveyor during a portion of its travel.

20. In a machine of the class described, in combination, shredding mechanism, molding mechanism, and an oven, a conveyor for said molding mechanism and a conveyor for said oven, said conveyor movable continuously in directions transverse to each other, and means for picking up the articles from the mold conveyor and transferring the articles to the oven conveyor, said means movable with the first conveyor during a portion of its travel, and toward and from the conveyor to pick up and transfer the articles.

21. In a machine of the class described, in combination, shredding mechanism, molding mechanism, and an oven, a conveyor for said molding mechanism and a conveyor for said oven, said conveyors movable continuously in directions transverse to each other, means for picking up articles from the mold conveyor and transferring the articles to the oven conveyor, including a pick-up device, and means for moving the said device in the direction of movement of one of the conveyors during a portion of its travel and at the same speed.

22. In a machine of the class described, in combination, shredding mechanism, molding mechanism, and an oven, a conveyor for said molding mechanism and a conveyor for said oven, said conveyors movable continuously in directions transverse to each other, means for picking up articles from the mold conveyor and transferring the articles to the oven conveyor, including a suction head movable between the conveyors, means for moving the head in the direction of travel of the first conveyor during the picking up of the articles, and means synchronized with the movement of the head between the conveyors for controlling the suction.

23. In a machine of the class described, in combination, shredding mechanism, molding mechanism, and an oven, a conveyor for said molding mechanism and a conveyor for said oven, said conveyors, adapted to travel at right angles to each other, and means for picking up articles from the mold conveyor, transferring same laterally thereof, and depositing them on the oven conveyor.

24. In a machine of the class described, in combination, shredding mechanism, molding mechanism, and an oven, a conveyor for said molding mechanism, and a conveyor for said oven, said conveyors, adapted to travel at right angles to each other, means for picking up articles from the mold conveyor and depositing them on the oven conveyor, including a pick-up device movable between the conveyors for the articles, and means for moving the said device in the direction of travel of the first conveyor and at the same speed.

25. In a machine of the class described, in combination, molding mechanism, including a conveyor therefor, baking mechanism including an oven and a conveyor therefor, a pick-up device, arms for supporting the device, means for swinging the arms laterally, and means for moving the device longitudinally of the arms, whereby said device will cooperate with each of said conveyors in turn.

26. In a machine of the class described, in combination, molding mechanism, including a conveyor therefor, baking mechanism including an oven and a conveyor therefor, a pick-up device, arms for supporting the device, means for swinging the arms laterally, means for moving the device longitudinally of the arms, and means for swinging the arms vertically to raise and lower the device, whereby said device will cooperate with each of said conveyors in turn.

27. In a machine of the class described, in combination, molding mechanism, including a conveyor therefor, baking mechanism including an oven and a conveyor therefor, a pick-up device including a suction head, arms for supporting the head, means for swinging the arms laterally and vertically, and means for moving the head longitudinally of the arms, whereby said device will cooperate with each of said conveyors in turn.

28. In a machine of the class described, in combination, molding mechanism, including a conveyor therefor, baking mechanism including an oven and a conveyor therefor, a pick-up device including a suction head, arms for supporting the head, means for swinging the arms laterally and vertically, means for moving the head longitudinally of the arms, and means controlled in coordination with the movement of the arms for controlling the pressure in the head, whereby said device will cooperate with each of said conveyors in turn.

29. In a machine of the class described, in combination, molding mechanism, including a conveyor therefor, baking mechanism including an oven and a conveyor therefor, a pick-up device, arms pivoted intermediate their ends for supporting the device, a plurality of means for swinging the arms in horizontal and vertical planes, and for sliding the device on the arms, and means for coordinating the operations of the several means, whereby said device will cooperate with each of said conveyors in turn.

30. In a machine of the class described, in combination, shredding mechanism, means for molding the shredded material into biscuits, comprising a chain of upper mold sections, a chain of lower mold sections, and a chain of end mold plates, each mold being formed by adjacent ends of the upper mold sections, adjacent ends of the lower mold sections and said plates.

31. In a machine of the class described, in combination, shredding mechanism, means for molding the shredded material into biscuits, comprising a chain of upper mold sections each having a transverse abutment intermediate its ends, a chain of lower mold sections each having a transverse abutment intermediate its ends, and a chain of end mold plates, each mold being formed by adjacent ends of the upper mold sections, adjacent ends of the lower mold sections and said plates, the molds extending from the abutments of one set of sections to the abutments of the adjacent set.

32. In a machine of the class described, in combination, a series of molds each composed of a plurality of upper mold sections, a plurality of lower mold sections, and a plurality of end plates, and means for supporting and moving the corresponding sections of all of the molds over endless paths lying adjacent during a portion of their travel, and means controlled by the movement of the sections for assembling the sections during a portion of such travel, and for afterwards dis-assembling the sections to expose the molded biscuit.

33. In a machine of the class described, in combination, molding mechanism comprising a series of sectional molds, the sections of which move in endless paths, each mold being formed from eight parts, comprising two upper sections, two lower sections, and two plates at each end of said upper and lower sections.

34. In a machine of the class described, in combination, molding mechanism comprising a series of upper mold sections, a series of lower mold sections, and a series of end mold sections, said sections being movable through endless paths, the molds being formed by the cooperation of adjacent halves of the upper mold sections with adjacent halves of the lower mold sections.

35. In a machine of the class described, in combination, shredding mechanism, a series of molds formed of a plurality of sections, means for moving a portion of the molds past the shredding mechanism in succession, and means controlled by the movement of the molds for successively assembling the sections to form open containers for receiving material and to afterwards close the molds to mold the material into biscuits, said sections each forming a portion of two adjacent molds.

36. In a machine of the class described, in combination, means for forming biscuits, comprising lower mold sections to which the shreds are delivered, upper mold sections, means for moving the sections along converging paths, and means for coordinating the movement of the sections to cause the upper sections to register with the lower sections during a portion of their travel, comprising a frame in which said upper mold sections are mounted and an adjusting member effective to move said frame and all of said upper mold sections longitudinally of said lower mold sections.

37. In a machine of the class described in combination, means for forming biscuits, comprising lower mold sections to which the shreds are delivered, a chain of upper mold sections, means for moving the sections along converging paths, means for coordinating the movement of the sections to cause the chain of upper sections to register with the lower sections during a portion of their travel, comprising a frame in which said chain of upper mold sections are mounted and an adjusting member effective to move said frame and all of said upper mold sections longitudinally of said lower mold sections, and means to vary the tension on said chain.

38. In a machine of the class described, in combination, means for forming biscuits, comprising lower mold sections to which the shreds are delivered, upper mold sections, means for moving the sections along converging paths, means for coordinating the movement of the sections to cause the upper sections to register with the lower sections during a portion of their travel, comprising a frame in which said upper mold sections are mounted and an adjusting member effective to move said frame and all of said upper mold sections longitudinally of said lower mold sections, and means for imparting relative movement to the sections toward and from each other when they are in register.

39. In a machine of the class described, in combination, means for forming biscuits, comprising lower mold sections, to which the shreds are delivered, a chain of upper mold sections, means for moving the sections along converging paths, means for coordinating the movement of the sections to cause the chain of upper sections to register with the lower sections during a portion of their travel, comprising a frame in which said chain of upper mold sections is mounted and an adjusting member effective to move said frame and all of said upper mold sections longitudinally of said lower mold sections, means for imparting relative movement to the sections toward and from each other when they are in register, and means to vary the tension on said chain.

40. In a machine of the class described, in combination, means for forming biscuits comprising chains of upper and lower mold sections, means for moving the chains of sections over endless paths with the upper section above the lower section during a portion of their travel, and means for coordinating the movement of the sections to cause the sections to register when they are adjacent, comprising a frame in which said upper mold sections are mounted and an adjusting member effective to move said frame and all of said upper mold sections longitudinally of said chain of lower mold sections, and means for imparting relative movement of the sections toward and from each other when they are in register.

41. In a machine of the class described, in combination, means for forming biscuits comprising chains of upper and lower mold sections, means for moving the chains of sections over endless paths with the upper section above the lower section during a portion of their travel, means for coordinating the movement of the sections to cause the sections to register when they are adjacent, comprising a frame in which said upper mold sections are mounted and an adjusting member effective to move said frame and all of said upper mold sections longitudinally of said chain of lower mold sections, means for imparting relative movement to the sections toward and from each other when they are in register, and means to vary the tension of said upper chain.

42. In a machine of the class described, in combination, means for forming biscuits, comprising chains of upper and lower mold sections, means for moving the chains of sections over endless paths with the upper section above the lower section during a portion of their travel, means for coordinating the movement of the sections to cause the sections to register when they are adjacent, comprising a frame in which said upper mold sections are mounted and an adjusting member effective to move said frame and all of said upper mold sections longitudinally of said chain of lower mold sections, and means for imparting relative movement from and toward each other to the adjacent runs.

43. In a machine of the class described, in combination, means for forming biscuits, comprising chains of upper and lower mold sections, means for moving the chains of sections over endless paths with the upper section above the lower section during a portion of their travel, means for coordinating the movement of the sections to cause the sections to register when they are adjacent, comprising a frame in which said upper mold sections are mounted and an adjusting member effective to move said frame and all of said upper mold sections longitudinally of said chain of lower mold sections, means for imparting relative movement from and toward each other to the adjacent runs, and means to vary the tension of said upper chain.

In testimony whereof I affix my signature

JOHN LEONARD KELLOGG.